United States Patent
Fish et al.

(10) Patent No.: US 10,467,906 B2
(45) Date of Patent: Nov. 5, 2019

(54) SYSTEM TO IDENTIFY A VEHICLE

(71) Applicant: Bosch Automotive Service Solutions Inc., Warren, MI (US)

(72) Inventors: James Fish, Birmingham, MI (US); Meghan E. Chamberlain, Royal Oak, MI (US); Michael Muller, Harper Woods, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 298 days.

(21) Appl. No.: 14/979,871

(22) Filed: Dec. 28, 2015

(65) Prior Publication Data

US 2017/0186324 A1   Jun. 29, 2017

(51) Int. Cl.
| | |
|---|---|
| G08G 1/00 | (2006.01) |
| G07C 5/00 | (2006.01) |
| G07C 5/08 | (2006.01) |
| G07C 5/02 | (2006.01) |
| G06Q 50/30 | (2012.01) |
| G06Q 10/08 | (2012.01) |

(52) U.S. Cl.
CPC .......... *G08G 1/20* (2013.01); *G06Q 10/0833* (2013.01); *G06Q 50/30* (2013.01); *G07C 5/008* (2013.01); *G07C 5/02* (2013.01); *G07C 5/0808* (2013.01); *G07C 5/0816* (2013.01)

(58) Field of Classification Search
CPC ...... G08G 1/20; G06Q 10/0833; G06Q 50/30; G07C 5/008; G07C 5/0808; G07C 5/0816
USPC ...................... 701/31.4, 31.9, 29.1
See application file for complete search history.

(56) References Cited

U.S. PATENT DOCUMENTS

| | | | |
|---|---|---|---|
| 6,625,539 B1 * | 9/2003 | Kittell | B60L 3/12 701/117 |
| 9,081,650 B1 | 7/2015 | Brinkmann et al. | |
| 9,536,254 B1 * | 1/2017 | David | G06Q 30/0278 |
| 2013/0066688 A1 * | 3/2013 | Pinkus | G06Q 10/06 705/7.41 |
| 2013/0317665 A1 | 11/2013 | Fernandes et al. | |
| 2015/0081362 A1 * | 3/2015 | Chadwick | G06Q 10/06311 705/7.14 |
| 2015/0371153 A1 * | 12/2015 | Lohmeier | G06Q 10/02 705/5 |
| 2016/0314629 A1 * | 10/2016 | Cuddihy | G07C 5/008 |
| 2016/0378303 A1 * | 12/2016 | Crilley | G06T 13/80 715/733 |

FOREIGN PATENT DOCUMENTS

| | | |
|---|---|---|
| EP | 2372378 A1 | 10/2011 |
| JP | 2013134641 A * | 7/2013 |

* cited by examiner

*Primary Examiner* — Isaac G Smith
(74) *Attorney, Agent, or Firm* — BakerHostetler

(57) ABSTRACT

A system that provides a safety rating for a driver or a vehicle to a rider of the vehicle. Information including diagnostic information such as sensor information and location information is used to determine the safety rating. By having a high safety rating, the rider of the vehicle has some level of assurance that the vehicle will arrive at a designated location.

20 Claims, 5 Drawing Sheets

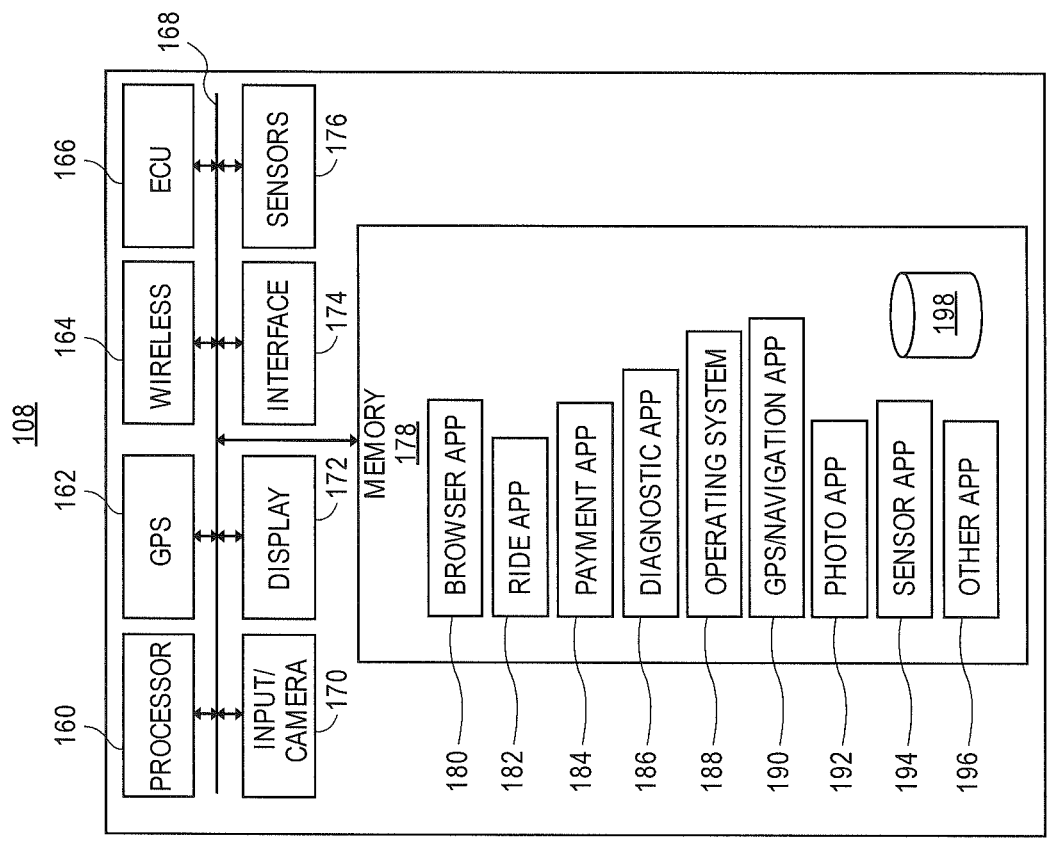
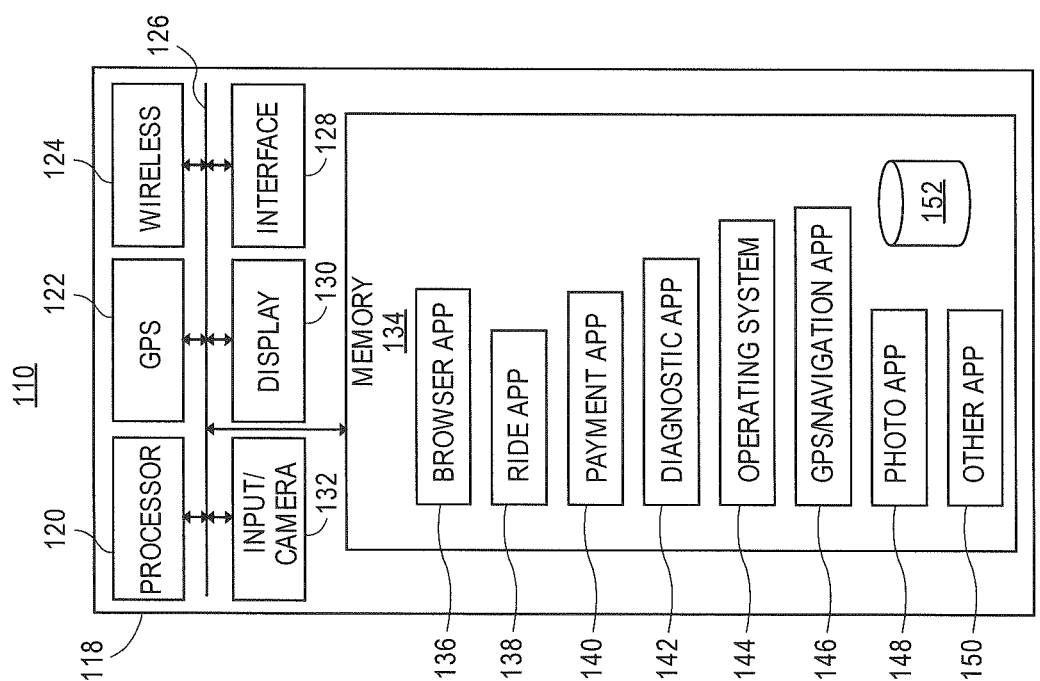

SYSTEM TO IDENTIFY A VEHICLE

FIELD OF THE INVENTION

The present invention relates generally to certifying a safe driver and/or vehicle. More particularly, the present invention relates to using vehicle data to certify a safe driver and/or vehicle.

BACKGROUND OF THE INVENTION

As the world is becoming more mobile, the use of private transportation such as taxis, and car services has become ubiquitous. Further, given that in major cities both parents often work, these parents must rely on friends and families to shuttle their children to and from school, sporting events, and other afterschool activities. Thus, safety has become paramount for these parents using family, friends and private transportation.

Car services such as UBER and LYFT provide safety features to consumers including background checks, extensive screenings and ensuring adequate insurance for the vehicle. Further, Uber recommends safe pickup locations, provides driver photos and disguised phone numbers. However, public transportation companies do not provide safety information about the driving behavior of the driver or the condition of the vehicle. Thus, the consumer takes a chance in riding in the vehicle that could break down before arriving at the final destination due to lack of maintenance of the vehicle or the driver not understanding the diagnostic codes that are set in the vehicle's onboard diagnostic (OBD-II) system and simply ignores the illuminated check engine light.

Accordingly, it is desirable to provide a consumer with information regarding the driving behavior of the driver and the condition of the vehicle so that the consumer can make an informed decision on whether to engage that driver or car service.

SUMMARY OF THE INVENTION

The foregoing needs are met, to a great extent, by the present invention, wherein in one aspect a system is provided that in some embodiments include a connected vehicle that communicates with a network such as a transit hub and/or with a wireless device of the consumer. The connected vehicle is monitored for the driving behavior of the driver and/or vehicle and the current diagnostic condition of the vehicle. The monitored information (driving behavior, vehicle condition) is sent to the transit hub where the vehicle and driver may be certified as safe and the certification may be transmitted to a wireless device of the consumer.

In accordance with one embodiment, a processor-implemented method of rating a vehicle programmed in a non-transitory processor-readable medium and to execute on one or more processors of a computer configured to execute the method includes, receiving vehicle diagnostic information collected from the vehicle with a processor of a remote computing device, analyzing the vehicle diagnostic information with the processor to determine a safety rating of the vehicle based on one or more set diagnostic trouble code (DTC) in the vehicle, storing the determined safety rating of the vehicle in a memory of the remote computing device, wherein the safety rating is used to determine whether or not the vehicle will arrive at a rider's designated location, receiving a request for a vehicle by the rider with the processor, and providing a list of nearby vehicles to the rider and the corresponding safety rating of the vehicles.

In accordance with another embodiment, a computing device provides a driver and a vehicle, that includes, a processor configured to control functions of the computing device via software and applications, a global positioning system configured to provide a location of the computing device in relation to a transit hub, a wireless interface configured to communicate with a remote device of the transit hub, and a memory in communication with the processor and configured to store an operating system and computer implemented instructions that include, sending a request for a vehicle and driver to the transit hub with the processor and the wireless interface, receiving a list of nearby vehicles with the processor and the wireless interface, and receiving vehicle information of a selected vehicle from the transit hub, the vehicle information including a safety rating of the vehicle, wherein the safety rating is an indication of whether the vehicle will arrive at a designated destination of a rider of the vehicle.

In accordance with another embodiment, a computing device provides a driver and a vehicle that includes, a processor configured to control functions of the computing device via software and applications, a wireless interface configured to communicate with a user's wireless device, and a memory in communication with the processor and configured to store an operating system and computer implemented instructions that include, receiving vehicle diagnostic information collected from the vehicle with the processor of the computing device, analyzing the vehicle diagnostic information with the processor to determine a safety rating of the vehicle based on one or more set diagnostic trouble codes (DTC) in the vehicle, storing the determined safety rating of the vehicle in a memory of the computing device, wherein the safety rating is used to determine whether or not the vehicle will arrive at a rider's designated location, receiving a request for a vehicle by the rider with the processor, and providing a list of nearby vehicles to the rider and the corresponding safety rating of the vehicles.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2A illustrates exemplary components of the wireless device to according embodiments of the invention.

FIG. 2B illustrates exemplary components of the connected vehicle according to embodiments of the invention.

DETAILED DESCRIPTION

Figure 1:
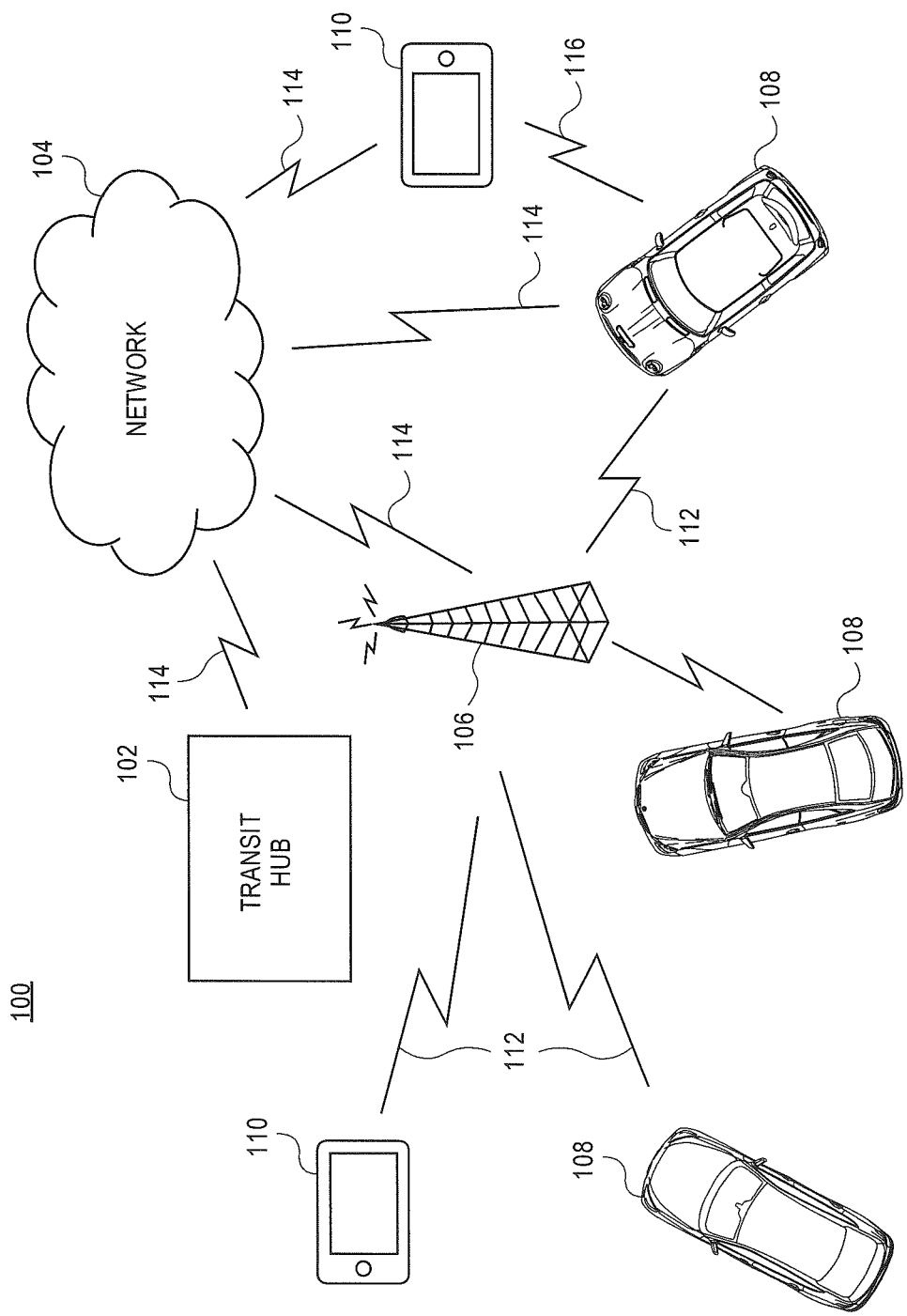
FIG. 1 illustrates a system where consumers and vehicles communicate with a network and each other according embodiments of the invention.

The invention will now be described with reference to the drawing figures, in which like reference numerals refer to like parts throughout. Embodiments of the invention allow a consumer to receive information on whether the driver and/or the vehicle is certified as being safe. Vehicle diagnostic information and driving behavior of the driver are sent to a transportation hub where the information is processed to determine if the vehicle and/or the driver can be certified as safe according to predetermined parameters. The certification can then be relayed to the consumer when the consumer hires the car service. The "safe certification" does not mean that it is absolutely safe to ride in the vehicle or that the driver is absolutely safe or is any kind of guarantee, but provides some assurances to the consumer that the driver and/or the vehicle will deliver the rider to his final destination.

FIG. 1 illustrates a system 100 where consumers and vehicles communicate with a network and each other according embodiments of the invention. The system 100 includes a transit hub 102, a network 104, a communication tower 106, the connected vehicle 108 and the consumer's wireless device 110 that are interconnected with each other via a wireless and/or wired connection. The transit hub 102 can serve as an information receiving and relaying hub between the connected vehicle 108 and the wireless device 110. The transit hub 102 is typically owned by the transportation company (yellow cab, LYFT, UBER, etc.) or can be a data center contracted by the transportation company or the consumer. Information received by the transit hub 102 includes driving behavior of the driver, a diagnostic condition of the vehicle, a form of payment by the consumer, a vehicle requested by the consumer, and position information of the vehicles and the consumers and the like. Information relayed by the transit hub 102 includes assigned vehicle and/or driver, payment receipt, locations of vehicles and/or drivers, types of available vehicles and/or drivers, time of arrival to the customer, and information about the vehicle and the driver and whether they are certified as safe, and the like. The connected vehicle 108, the wireless device 110, the communication tower 106, and the network 104 can communicate with each other via a wireless or wired connection 112, 114, 116. The network 104 is also connected to the transit hub 102.

A connected vehicle 108 is capable of communicating with the transit hub 102, other connected vehicles 108 or wireless devices 110 such as a smart phone, a personal digital assistant, a videogame console, smart glasses, a smart watch, a tablet, a laptop or the like. The connected vehicle 108 can communicate via a connection 112, which is a wired or wireless connection. The connection 112 can communicate with a communication tower 106 or a satellite (not shown) or the like. The connected vehicle 108 can have a connection 114 that is also a wired or wireless connection. The connection 114 can communicate with a network 104, which may be the Internet, other distributed network, WLAN, LAN, and the like. The connected vehicle 108 may also communicate directly with a wireless device 110 via the connection 116, which may be a wired or wireless connection. It should be noted, the connections 112, 114, 116 may be the same or different types of connections from each other. The wired connections may include USB (universal serial bus), FireWire, serial, parallel and the like while the wireless connections may be via Wi-Fi, BLUETOOTH, ZIGBEE, near field communications, radiofrequency, satellite, cellular and the like.

The connected vehicle 108 can be connected to the transit hub 102 and/or the network 104 either automatically such as when the vehicle is within communication range or connected manually by the driver. The location of the connected vehicle 108 can be determined using location determination means such as a global positioning system (GPS) 162 (FIG. 2B). Additionally, vehicle information, vehicle diagnostic information and driving characteristics of the driver may be sent to the transit hub 102 for analysis.

Vehicle information such as vehicle identification number (VIN), license plate and registration (valid until date), make, model, year, mileage and the like may be communicated to the transit hub via the connection 114, or the connection 112 or both. Vehicle diagnostic information such as set diagnostic trouble codes (including emissions), brake pad sensors, tire pressure, oil gauge, engine temperature, mileage, last vehicle inspection, service or repair, warranty information, fuel tank, fuel consumption rate, amount of remaining battery charge (electric or hybrid vehicle), battery consumption rate, last oil change, air bag deployments and the like are also communicated to the transit hub 102. Sensors of the vehicle may provide driving characteristics of the driver such as hard braking, excessive acceleration, excessive braking, swerving or other evasive maneuvers, crashes, excessive lane changes, and the like. In another embodiment, the driver's wireless device 110 can also provide similar information based on the wireless device's sensors such as an accelerometer, GPS, position sensor, or use of Wi-Fi and cellular based on the movement of the wireless device in relation to the Wi-Fi or cellular source.

The wireless device 110 may be used by the consumer to arrange transportation for himself, a friend, family member or the like with the transit hub 102. The consumer may select a desired vehicle type and notify location for pickup via the wireless device 110. The wireless device 110 can also receive information that the connected vehicle 108 and/or driver is certified as safe. In another embodiment, the wireless device 110 and the connected vehicle 108 may communicate directly with each other in addition to communicating via the network 104.

When the driver and/or vehicle is "certified safe," there is a degree of confidence that that the consumer or passenger will arrive at his destination. That is, the driver has not driven erratically or abnormally (e.g. hard braking, swerving, rapid acceleration, etc.) over a predetermined period of time such as in the last 24 hours, 48 hours, 72 hours, week, month, six months, year and the like or that the driver has not caused the vehicle to swerve or brake hard for a predetermined number of times within a predetermined period of time, such as 3 times within 1 or 2 days or 5 times within 5 or 7 days. The predetermined amount of time or number of times may be based on a number of factors such as on the location where the vehicle is being driving. That is if the vehicle is driven in densely populated cities (New York, Los Angeles, etc.), the predetermined amount of time or number of times may be more than if the vehicle is driving in less populated cities like Kalamazoo, Mich., given the chance of interactions with more vehicles (bus, cars, bikes) is highly likely in more populated cities. Other factors are the time of day that the erratic or abnormal behavior is occurring as this could be during traffic in NY city where sudden braking or acceleration is typical or weather events such as windstorms or snow storms that cause the driver to weave erratically, but may be considered normal under the circumstances.

A database of an average number of hard braking, swerving, rapid acceleration and the like driving may be stored on the server of the transit hub 102 based on some of the factors (location, time of day, weather) discussed herein may be used as a baseline to determine whether the driver or the vehicle is driven erratically or abnormally. Information from other connected vehicles 108 and/or wireless devices 110 may be sent to the transit hub for dynamic updating of the database so that the driver or the vehicle is not penalized for driving similarly to other drivers or vehicles based on the same factors.

Further, based on diagnostic information received from the vehicle, such as the vehicle does not have any diagnostic trouble codes set, had scheduled maintenance services completed, has sufficient fuel or battery, does not have any type pressure issues, brake pads are not worn, and the like that would hamper the vehicle from reaching its desired destination. The embodiments of the invention will work for any vehicle (taxi, private vehicle, planes, boats, trains, etc.) or driver such as friends, family, drivers for hire and the like.

FIG. 2A illustrates exemplary components of the wireless device 110 according to embodiments of the invention. The wireless device 110 may be used by a consumer and/or the driver of the vehicle. The wireless device 110 may include a housing 118 that houses components such as a processor 120, a global positioning system (GPS) 122, a wireless communicator 124, a bus line 126, an interface 128, a display 130, an input 132 that may include a camera, and a memory 134.

The housing 118 may contain all the components therein or have components attached on the outside thereof. The housing 118 may be made of any material including an alloy such as aluminum or an elastomeric material and the like. The processor 120 may be any type of processor including a controller, FPGA (field programmable gate array), ASIC (application specific integrated circuit), microcontroller and the like. The global positioning system (GPS) 122 provides location information (including longitudinal and lateral data) of the wireless device. The global positioning system (GPS) 122 can be based on satellites, cellular, wireless signals such as Wi-Fi signals, or sensors and the like. GPS related sensors or the driver's wireless device 110 can also provide similar information based on the wireless device's sensors such as an accelerometer, position sensor, or use of Wi-Fi and cellular based on the movement of the wireless device in relation to the Wi-Fi or cellular source.

The wireless communicator 124 allows for any type of wireless communication or protocols such as Wi-Fi, BLUETOOTH, ZIGBEE, near field communications, radiofrequency, infrared, satellite, cellular and the like. The wireless communicator 124 includes the necessary receivers, transmitters or transceivers and various communication and security protocols in order to allow communication between the wireless device 110 and other devices or network 104. The interface 128 allows additional connections and transmission such as data or information, to and from the wireless device 110. Additional connections may include USB, FireWire, serial, parallel and the like. The interface 128 can also connect the wireless device 110 to other externally devices including network, scanners, printers, another computing device or wireless device and the like. Display 130 can be any type of display including touchscreen, LCD (TFT, IPS, etc.), OLED, AMOLED, retina display, gorilla glass and the like. Input 132 may be any type of input including directional keys, enter keys, number keys or alphanumeric keys that are either physical or virtual (GUI). The input 132 may also be a camera so that images may be captured and converted to useful information using image or optical recognition software (such as the photo application 148) and the like. The camera may be used to capture an image of the driver to confirm his identity so that image recognition software (linked to database 198, 324) is utilized to further identify the driver. This also provides the user or rider with some assurances in the event that the user is unable to recognize the driver from the picture (# the driver information 504 of FIG. 5), such as when the user has poor eye sight and other issues. That is, the capturing and identifying of the driver with his captured image allows a degree of confidence that the driver is the correct driver. Similarly, the camera can also capture the image of the vehicle and using optical recognitions software and database 198, 324 to confirm that the vehicle is the requested or assigned vehicle. A bus line 126 allows communications between the components of the wireless device 110 including with the memory 134.

The memory 134 stores information, formulas, objects, data, operating system 144, various applications (apps.) and the like, all of which may be displayed on display 130 or an external display. The applications and operating system can be preloaded or downloaded from an application site, such as APPLE App, Transit hub or GOOGLE PLAY and the like. Examples of applications include browser app 136, ride app 138, payment app 140, diagnostic app 142, GPS/navigation app 146, photo application 148, and other app 150 that are loaded onto memory 134. These are examples of apps that can be utilized in embodiments of the invention, however, a person skilled in the art would recognize that other apps can be utilized to practice the invention.

The browser app 136 can be any type of browser that allows the consumer to interact with a transit hub's website or webpage and the like. Examples of browsers include APPLE Safari, MICROSOFT EXPLORER or Edge, GOOGLE CHROME and the like. Ride app 138 allows the user to request a vehicle to be dispatched at the user's location or other designated location and to pay for the ride once the destination is reached. The ride app 138 allows the user to communicate or interact directly with the transit hub or the driver of the requested vehicle. That is the user's devices are registered and communication protocols and applications may be identified so that user can communicate with the driver or the transit hub using similar communication application or protocols, such as a messaging application. The phone numbers of the user and the driver may be scrambled or hidden to protect each from being harassed by the other in the event the ride didn't go well. The ride app 138 may be provided as part of a product, such as a phone or can be downloaded from an app store and may be provided free of charge or be subscription-based including one-time fee, monthly fee, yearly fee or the like.

The ride app 138 is configured to determine the location of the wireless device (or the connected vehicle) via the global positioning system (GPS) 122, for example, and allows the driver to know the user's location. Further, the ride app 138 may show on a map the location of various vehicles available to hire and their respective travel time to the user.

The payment app 140 such as APPLE PAY or GOOGLE PAY, can be used to purchase the ride from the transit hub 102 or the driver directly. In one embodiment, the payment app 140 can be integrated with the ride app 138 to perform the payment function. The payment app 140 can be linked to a bank account, credit card, debit card, gift card and the like. The payment app 140 also can also store user account information such as name, address, phone numbers, log-in information and the like.

The diagnostic app 142 such as U-Scan™ app (from Bosch Automotive Service Solutions Inc., Warren, Mich.), may be used to communicate with a connected vehicle 108 built-in diagnostic system in order to receive diagnostic information or diagnose issues with the connected vehicle. Alternatively, if the vehicle is not a connected vehicle (no wireless communication, for example), then the user can use ACTRON CP9599 (from Bosch Automotive Service Solutions Inc, Warren, Mich.) along with the U-SCAN™ app in order to diagnose the vehicle. Diagnostic information received from the vehicle can include set diagnostic trouble codes (including emissions), brake pad sensors, tire pressure, oil gauge, engine temperature, mileage, last vehicle inspection, service or repair, warranty information, fuel tank level, fuel consumption rate, amount of remaining battery charge (electric or hybrid vehicle), battery consumption rate, last oil change, air bag deployments and the like. Any vehicle information can be received from the vehicle in order to determine if the vehicle will arrive at the user's desired location.

Figure 5:
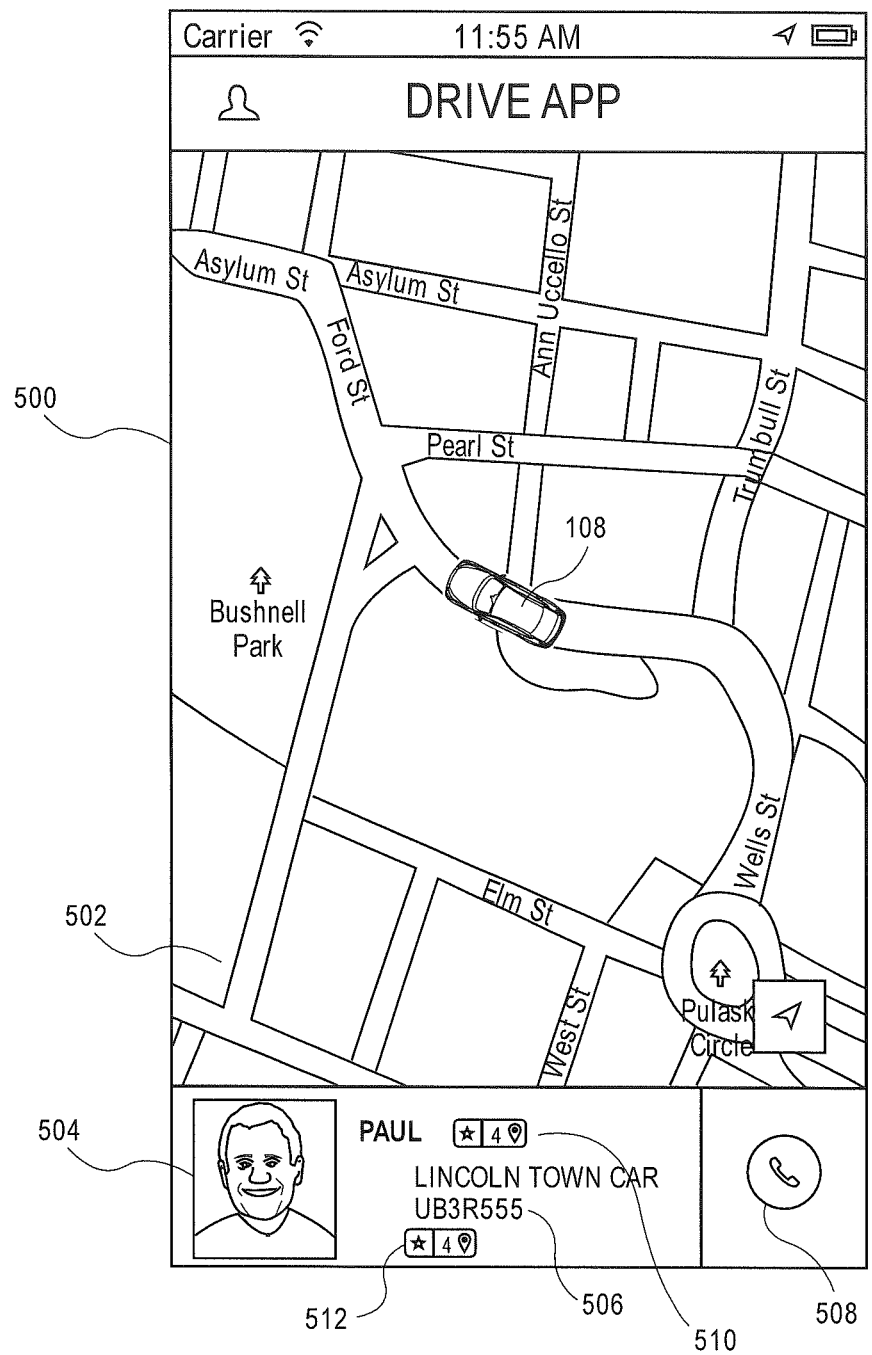
FIG. 5 illustrates a GUI having driver information and vehicle information according to an embodiment of the disclosure.

The diagnostic app 142 may also be used to assess the driver's driving behavior. In one embodiment, sensors of the vehicle may provide driving characteristics of the driver such as hard braking (pressure and inertial sensors), excessive acceleration (inertial navigation sensors), excessive braking (force sensors), swerving or other evasive maneuvers (lane change sensors), crashes (air bag sensors), excessive lane changes, and the like. In another embodiment, the driver's wireless device 110 can also provide similar information based on the wireless device's sensors such as an accelerometer, GPS, position sensor, or use of Wi-Fi and cellular based on the movement of the wireless device in relation to the Wi-Fi or cellular source. By assessing the driver's driving behavior, the diagnostic app 142 can help predict whether a driver is a safe driver or caution should be used when hiring the driver. Assessment information of the driver and/or the vehicle may be sent to the user's phone as shown in FIG. 5.

The operating system 144 is also stored in memory 134. The operating system can be any operating system such as LINUX WINDOWS, APPLE iOS or GOOGLE ANDROID and the like. The operating system 144 allows the wireless device 110 to interact with the various apps that are stored in the memory 134. Additionally, the operating system 144 allows for other functions and components of the wireless device 110 to properly communicate with each other. Also stored in the memory 134, is the GPS/navigation app 146, which may allow the ride app 138 to determine the location of the wireless device 110 in relation to the transit hub 102 and/or the connected vehicle 108.

The photo application 148 allows the images captured by the input 132 that may include a camera to be processed and organized in the memory 134. Photo application 148 also allows for manipulation of the image and performs image or optical recognition of the captured image. Database 152 can include information such as images of vehicles, drivers, parts, diagnostic information (code interpretation, level of urgency to bring vehicle into the shop, etc.), data to help diagnose the vehicle, driver or other products, maps, weather information, formulas and the like. The database can include any information that is utilized in the embodiments of the invention. Other app 150 can also be stored in memory 134 and can be any app to practice the embodiments of the invention.

In other embodiments, the wireless device can perform all the functionality described herein to determine whether the driver and/or the vehicle can be certified as safe.

FIG. 2B illustrates exemplary components of the connected vehicle 108 according to embodiments of the invention. Connected vehicle 108 includes various components such as a processor 160, a global positioning system (GPS) 162, a wireless communicator 164, an electronic control unit (ECU) 166, the bus line 168, input 170 implemented as a camera, display 172, interface 174, sensors 176 and memory 178. These components may be similar to components of the wireless device 110.

The processor 160 may be any type of processor including a controller, FPGA (field programmable gate array), ASIC (application specific integrated circuit), microcontroller and the like. The global positioning system (GPS) 162 provides location information (including longitudinal and lateral data) of the connected vehicle 108. The location information can be used provide distance between the vehicle and the user requesting the vehicle and time of arrival of the vehicle to the user. The global positioning system (GPS) 162 can be based on satellites, cellular, or wireless signals such as Wi-Fi signals, or sensors and the like. In another embodiment, the connected vehicle other components can also provide similar information based on the connected vehicle's sensors such as an accelerometer, position sensor, or use of Wi-Fi and cellular based on the movement of the connected vehicle in relation to the Wi-Fi or cellular source.

The wireless communicator 124 allows for any type of wireless communication or protocols such as Wi-Fi, BLUETOOTH, ZIGBEE, near field communications, radiofrequency, infrared, satellite, cellular and the like. Wireless communicator 124 includes the necessary receivers, transmitters or transceivers and various communication and security protocols for the connected vehicle to communicate with other devices or databases.

The electronic control unit (ECU) 166 can control various components of the connected vehicle to ensure optimal engine performance. The electronic control unit (ECU) 166 communicates with the various sensors 176 in the connected vehicle 108 and also communicates with the on-board diagnostic system (OBD-II) that provides diagnostic information about the connected vehicle to external devices such as the wireless device 110 or the transit hub 102. Vehicle diagnostic information such as set diagnostic trouble codes (including emissions), brake pad sensors, tire pressure, oil gauge, engine temperature, mileage, last vehicle inspection, service or repair, warranty information, fuel tank level, fuel consumption rate, amount of remaining battery charge (electric or hybrid vehicle), battery consumption rate, last oil change, air bag deployments and the like are also communicated to the wireless device 110 or the transit hub 102.

The input 170 may be any type of input including directions keys, enter keys, number keys or alphanumeric keys (keys can be physical or virtual). Input 170 may also be a camera so that images may be captured and converted to useful information using image recognition software or optical recognition software, the photo app 192, and the like. In one embodiment, the input 170 implemented as a camera (forward facing or rear facing of the vehicle) may be used to capture an image of the user or rider to confirm their identity so that image recognition software (linked to database 198, 324) is utilized to identify the user or the rider. This also provides the driver with some safety measures in the event that the person wants to rob or do harm to the driver. That is, the capturing and identifying of the user and rider with their captured image allows a degree of confidence that the user or rider is the correct person to pick up.

The display 172 can be any type of display including touchscreen, LCD (TFT, IPS, etc.), OLED, AMOLED, retina display, gorilla glass and the like. The display may also be built-in to the vehicle entertainment system or be a heads-up-display. Interface 174 allows additional connections and transmission such as data or information, to and from the connected vehicle 108. Additional connections may include USB, FireWire, serial, parallel and the like. Interface 174 can also connect the connected vehicle to other externally devices including network, scanners, another computing device or wireless device and the like. The sensors 176 may be any type of sensors including temperature, airbag, inertial, inertial navigation, force, pressure, brake, throttle position, lane change, and the like. A bus line 168 allows communications between the components of the connected vehicle 108 including the memory 178.

The memory 178 stores various information, objects, data, operating system 188, and various applications (apps.), all of which may be displayed on display 172 or an external display. The applications and operating system can be pre-loaded or downloaded from an application site, such as APPLE App, Transit hub or GOOGLE PLAY and the like. Examples of applications include browser app 180, ride app 182, payment app 184, diagnostic app 186, GPS/navigation app 190, photo app 192, sensor app 194, and other app 196 as loaded onto memory 178. These are examples of apps that can be utilized in various embodiments of the invention, however, a person skilled in the art would recognize that other apps can be utilized to practice the invention. These applications can be the same or different from the applications stored in the wireless device 110.

The browser app 180 can be any type of browser that allows the consumer to interact with a transit hub's website or webpage and the like. Examples of browsers include APPLE Safari, MICROSOFT EXPLORER or Edge, GOOGLE CHROME and the like. Ride app 182 allows the driver to communicate with the transit hub 102 or the wireless device. That's the user's devices are registered, and communication protocols and applications may be identified so that a user can talk directly with the driver or transit hub using similar communication application or protocols, such as a messaging application. The ride app 182 may be provided as part of a product, such as a phone or diagnostic tool or can be downloaded from an application site and may be provided free of charge or subscription-based including one-time fee, monthly fee, yearly fee or the like.

The ride app 182 is configured to determine location of the connected vehicle 108 via the global positioning system (GPS) 162, for example, and allows the user or rider and the transit hub to know the vehicle's location. Further, the ride app 182 may show on a map the location of pickup and final destination.

The payment app 184 such as APPLE PAY or GOOGLE PAY can be used to purchase the ride from the transit hub 102 or the driver directly. In one embodiment, the payment app 184 can be integrated with the ride app 182 to perform the payment function. The payment app 184 can be linked to a bank account, credit card, debit card, gift card and the like. The payment app 184 also can store account information such as name, address, phone number, log-in information and the like. Diagnostic app 186 such as U-Scan™ app, may be used to diagnose the connected vehicle 108 or to retrieve diagnostic trouble codes and other diagnostic information and forward it to another computing system in the vehicle or an external device such as the wireless device 110. Alternatively, if the vehicle is not a connected vehicle, then the user can use ACTRON CP9599 along with the U-Scan™ app in order to diagnose the vehicle and forward the diagnosis or retrieved diagnostic trouble code (DTC) or diagnostic information to the wireless device 110 or the network 104. Diagnostic information forwarded or received from the vehicle can include set diagnostic trouble codes (including emissions), brake pad sensors, tire pressure, oil gauge, engine temperature, mileage, last vehicle inspection, service or repair, warranty information, fuel tank level, fuel consumption rate, amount of remaining battery charge (electric or hybrid vehicle), battery consumption rate, last oil change, air bag deployments and the like. Any vehicle information can be forwarded or received from the vehicle in order to determine if the vehicle will arrive at the user's desired location. As noted here, sensors of the vehicle may provide driving characteristics of the driver.

The operating system 188 is also stored in memory 178. The operating system can be any operating system such as LINUX, WINDOWS, APPLE iOS or GOOGLE ANDROID and the like. The operating system 188 allows the connected vehicle 108 to interact with the various apps that are stored in the memory 178. Additionally, the operating system 188 allows for other functions and components of the connected vehicle to properly communicate with each other. Also stored in the memory 178, is the GPS/navigation app 190, which may allow the ride app 182 to determine the location of the connected vehicle 108 in relation to the transit hub 102 or the wireless device 110. The GPS/navigation app 190 also provides directions to the transit hub 102 or the wireless device to the user.

The photo app 192 allows the images captured by the input 170 implemented as a camera to be processed and organized in the memory 178. Photo app 192 also allows for manipulation of the image and performs image or optical recognition of the captured image. Database 198, 324 can include information such as images of transit hubs, riders, maps, formulas, weather information, products, vehicles, parts, or diagnostic information and data to help diagnose the vehicle or other products. The database 198 can include any information that is utilized in the embodiments of the invention.

The sensor app 194 allows for interpretation of various sensors (discussed herein) that is in a product or the connected vehicle 108. The sensor app 194 can also interact with other apps including the diagnostic app 186 to provide sensor data as a part of the diagnostic. Other apps 196 can also be stored in memory 178 and can be any app in order to practice the embodiments of the invention.

Figure 3:
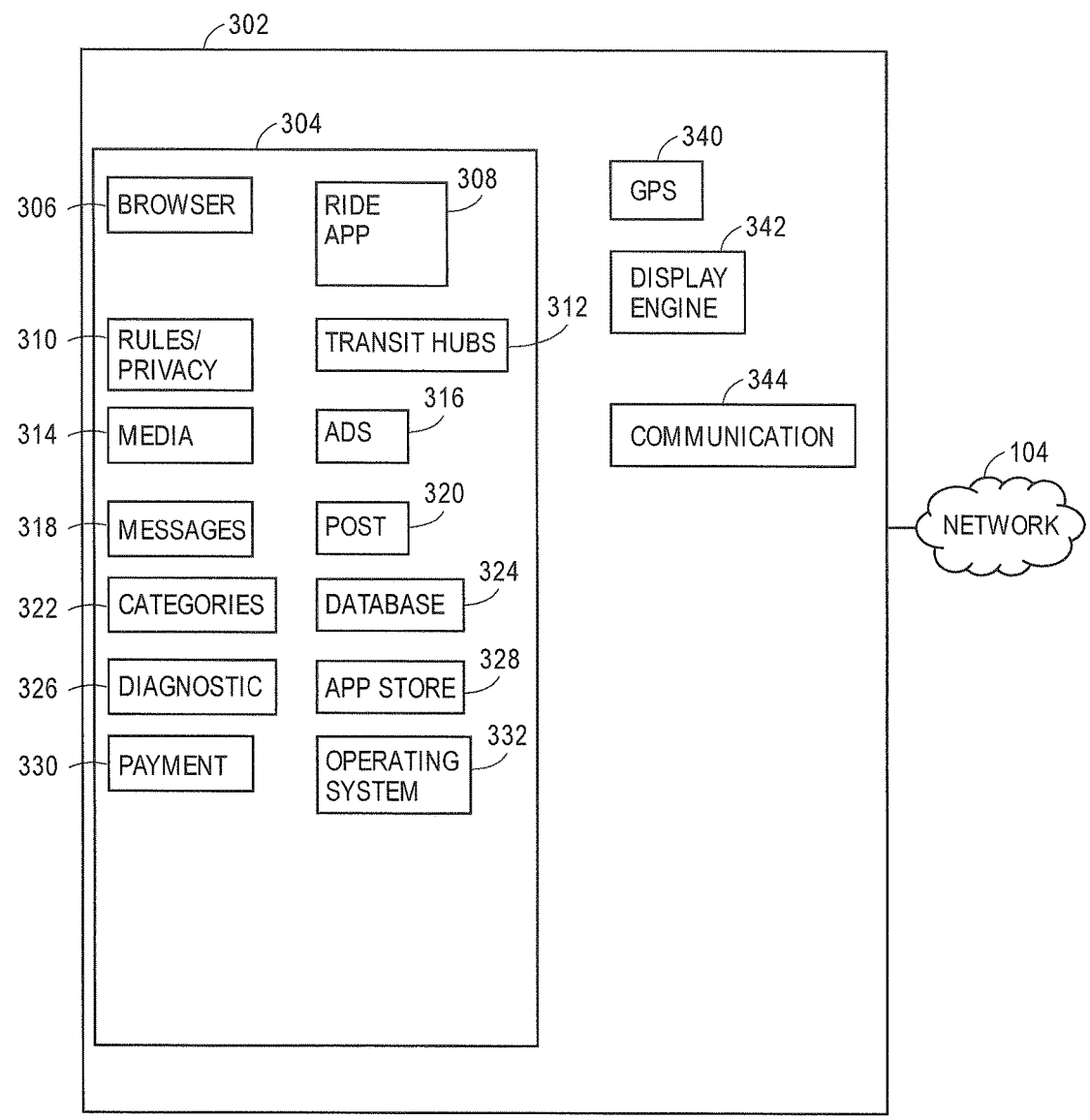
FIG. 3 illustrates exemplary components of a server of a transit hub according to embodiments of the invention.

FIG. 3 illustrates exemplary components of server 302 of a transit hub 102 according to embodiments of the invention.

Major hardware components of the server such as processor, power source, interfaces (input/output), other memories and components that are part of the server 302 are not shown but are known in the art.

The memory 304 may store various information, formulas, images, objects, data, applications and the like. The applications that may be stored in the memory 304 may include Browser Manager 306, Ride Manager 308, Rules/Privacy Manager 310, Transit hubs Manager 312, Media Manager 314 or content manager, Ads Generator 316, Messages Manager 318, Post Manager 320, Categories Manager 322, Database 324, diagnostic app 326 or diagnostic manager, App Store 328, and Payment Manager 330. Other applications may also be stored to practice the embodiments of the invention. These applications/managers may interact with each other in order to function properly. Further, these applications can also interact with ride app 138, 182 so that the desired functions and operations described herein can be utilized on the wireless device 110 and/or the connected vehicle 108. An operating system 332 is also stored in memory 304.

The browser Manager 306 interacts with the browsers used by the user's device (i.e. wireless device or connected vehicle) such as APPLE Safari, MICROSOFT or Edge, GOOGLE CHROME and the like and also interacts with the various applications discussed herein. The Browser Manager allows the user and/or the server (or Transit hub) owner to perform operations such as controlling the browser content including, posting, messaging, multimedia content and the like. The Browser Manager 306 may interact with the ride app 138, 182 in order to provide the user with the desired experience. Ride Manager 308 can control or catalog the multitude of users, riders, drivers, and vehicles (and their respective images and information) including log-in information, location of the user, consumer, driver and vehicle, confirming riders with vehicle and driver, providing final destination of the rider, tracking various beginning and final destinations, preferences (mailing, driver, vehicle, routes, settings, purchases, etc.), payment information, physical addresses, and virtual addresses such as emails, phone numbers and the like. Rules/Privacy Manager 310 may control the various rules settings of the website of the transit hub including controlling different privacy levels set by the user or settings imposed by the website owner (transit hub).

The transit hubs Manager 312 can manage information about the various transit hubs including their location in various cities, transit hub hours, services, drivers, vehicles provided at each transit hub, contact information of the transit hubs such as addresses, emails, phone numbers, webpages, other social media sites, and the like. Based on the location of the wireless device 110, the transit hub manager will know which transit hub utilized in order to service the user or rider. Media Manager 314 can control the multimedia information (visitor information, nearby restaurants, stores, etc.) may be uploaded or downloaded to the user or rider to make the experience of being driven more enjoyable. Multimedia information may include links, news, video files, photographs, audio files (music, sound, etc.) and the like. Ads Generator 316 may control the various ads that may be present on the website or on the ride app 138 including their placement in terms of position and timing. Messages Manager 318 can control the various messages that are being posted and responded to by the various users. Messages Manager 318 may also be a "messenger" system that is separate from the website so that users and drivers may communicate with each other as explained herein. By having the "messenger" system separate from the website, this helps to control amount of information that is being processed by the transit hub's website at any given time and may allow for faster real-time messaging to occur.

The post manager 320 can control posting by the user including formatting the posting, length of the posting, moderating the posting, controlling who can post or reply to the posting, and the like. Posts can be posted on a virtual blackboard for the transit hub. Categories Manager 322 can control various categories that are displayed on the website or in the ride app 138, 182. Categories may include notifications, interests, apps, nearby friends, stores, restaurants, events, and the like.

The database 324 can be used to store various information and data including pictures, images, software, maps, media files (video and audio), diagnostic information, user information, posting information, messaging information, transit hub information, rules information, weather information, setting information, ads information, categories information, application information, browser information, location information, payment information, and the like. Database 324 may also be accessed via the network 104 by the wireless device 110, the connected vehicle 108 or other external devices. Database 324 can also access other databases via the network 104. The diagnostic app 326 or diagnostic manager can control various diagnostic functions including vehicle diagnostics for vehicles such as the connected vehicle 108 or other products including the wireless device and the like. The diagnostic app 326 or diagnostic manager can also interact with a wireless device 110 to diagnose vehicles such as the connected vehicle 108 and analyze driving habits of the driver. The diagnostic manager receives vehicle diagnostic information and then can assess and determine whether the vehicle and/or the driver is considered safe based on information received from the connected vehicle 108 and/or the wireless device 110 of the driver. For example, the diagnostic manager can determine if any set DTCs will impair the vehicle's ability to reach its final destination such as misfires on multiple cylinders or there is not enough fuel left in the vehicle to reach the final destination or the tire pressure is below an accepted safety level of the tire or vehicle manufacturer.

The App Store 328 can control various apps that can be downloaded to devices such as the wireless device 110 or the connected vehicle 108. Examples of the App Store include GOOGLE PLAY and APPLE App Store and the like. Payment Manager 330 allows the user to pay for ride or other services at the vehicle (physically or virtually) either by entering their own credit card, debit card, gift card and discount codes or interacting with other pay services such as PayPal, APPLE PAY, GOOGLE PAY and the like. The Payment Manager can store credit card, debit card, gift card, discount codes, contact information (addresses, phone numbers, emails, etc.) and the like. Operating system 332 stored in the memory can include Apple iOS, GOOGLE ANDROID, WINDOWS 10, LINUX and the like.

Other components for server 302 can include a GPS System 340, a display engine or the graphical user interface (GUI) generator 342, and communication interface 344. The GPS system 340 can track the various locations of the transit hubs, vehicles, drivers, users and riders and provide directions to each. Display engine or the graphical user interface (GUI) generator 342 can control display of information on the display 130 of the wireless device 110 or the display 172 of the connected vehicle 108. For example, the grpahical user interface (GUI) generator 342 can control various parts of the browser or ride app such as respective driver, vehicle, user and/or rider profile information, postings, multimedia content and the like. Further, the graphical user interface (GUI) generator 342 can also interpret the interactions by the user of the wireless device 110 or of the connected vehicle 108 so that requested information or received information are properly processed. Communication interface 344 allows for wired or wireless communication between the server and its components and the network 104. Wired connection may be USB, Fire Wire, serial, parallel and the like. Wireless communication may include Wi-Fi, BLUETOOTH, ZIGBEE, near field communications, radiofrequency, satellite, cellular and the like.

Figure 4:
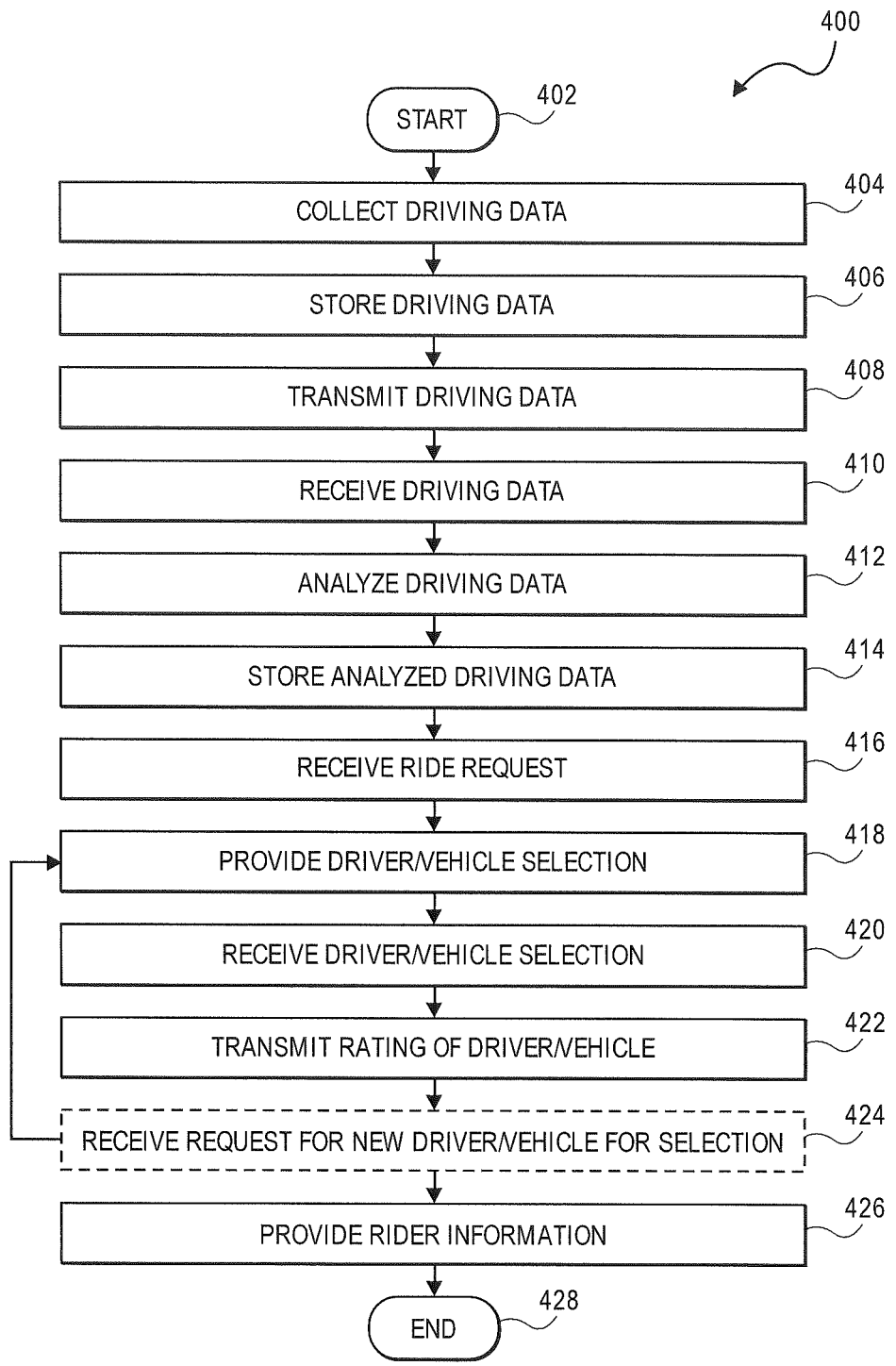
FIG. 4 illustrates a method for providing whether a requested driver/vehicle will arrive at the final destination based on driving habits and vehicle diagnostics.

FIG. 4 illustrates a method 400 for providing whether a requested driver/vehicle will arrive at the final destination based on driving habits and vehicle diagnostics. The method 400 may be implemented using the various components described herein. At step 402, the method starts and proceeds to step 404. At step 404, the wireless device 110 and/or the connected vehicle 108 collects driving data or diagnostic information from the connected vehicle 108 or driving behavior of the driver and store it in diagnostic app 142, 186, 326. Diagnostic information includes set diagnostic trouble codes (including emissions), brake pad sensors, tire pressure, oil gauge, engine temperature, mileage, last vehicle inspection, service or repair, warranty information, fuel tank level, fuel consumption rate, amount of remaining battery charge (electric or hybrid vehicle), battery consumption rate, last oil change, air bag deployments and the like. Driving data may include hard braking, excessive acceleration, excessive braking, swerving or other evasive maneuvers, crashes, excessive lane changes, and the like. Driving data may also include GPS location of the vehicle/driver to determine whether the vehicle is being driven in a densely populated area or a sparsely populated area. Further, time of day and weather when the hard braking, acceleration and/or swerving occurred are also collected and stored.

At step 406, the driving data and diagnostic data received in step 404 may be stored in a memory 134, 178, 304, database 152, 198, 324 or the diagnostic app 142, 186, 326. At step 408, the stored driving data and diagnostic data may be transmitted (continuously or intermittently) to server 302, if it was stored on the connected vehicle 108 or the wireless device 110. The driving data and diagnostic data may be transmitted from the connected vehicle 108 or the wireless device 110 via the network 104, communication tower 106, or directly to the server 302. At step 410, the server 302 receives the transmitted stored driving data and diagnostic data and stores it in the diagnostic app 326 or the database 324 of memory 304.

At step 412, the diagnostic app 326 analyzes the driving data and diagnostic data to determine if based on the driving data and diagnostic data whether the driver/vehicle is safe. That is will the vehicle arrive at the rider's final destination. For example, if there is set DTCs that are deemed critical that could affect the drivability of the vehicle such as a misfire in 2 or more cylinders of the engine, then the vehicle may be considered not as likely to reach the rider's final destination. Driving data for the driver may also be taken into account such as the number of times the vehicle swerved or hard braked over a predetermined period of time. Location of the vehicle and driver, weather conditions, and the time of day (rush hour or not) can also be taken into account as part of the analysis. Thus, should the number of hard braking was determined to be too much (6 times in one hour) over a period of time would deem the driver to be not a safe driver, and then the location (NY city) and that the hard braking occurred during a particular time of day (5:30 PM on a workday) can be taken into account or off-set so that the driver could be deemed to be a "safe" driver. In other words, analyzing the available driving data and diagnostic data to determine if there is a chance that the vehicle will not reach the rider's final destination based on the driving habits of the driver or the vehicle diagnostic information. The analyzing step may be intermittent, for example every five minutes, 30 minutes, every hour, every 5 hours, every 24 hours, every other day, every week and the like or the analyzing step may be continuous or on the fly.

At step 414, the analyzed driving data can be stored on the server 302 (e.g. database 324, diagnostic app 326). In other embodiments, the analyzed data can be transmitted to and stored on the connected vehicle 108 or the wireless device 110. Thus, the rider can receive the safe certification directly form the server 302, connected vehicle 108 or the wireless device 110. At step 416, the server 302 (or the connected vehicle or wireless device of the driver) can receive a ride request from ride app 138 and then proceeds to step 418. At step 418, the graphical user interface (GUI) generator 342 interacting with the ride app 138 may provide a list of nearby drivers or vehicles for selection by the user and may also include the locations of the available drivers or vehicles. In one embodiment, the rider may have his own vehicle but wants to hire a "safe" driver or the rider wants to drive but needs a "safe" vehicle to rent. Thus, the ride app 138 on the driver's wireless device 110 may be used by the driver to reply to the ride request. The graphical user interface (GUI) generator 342 may also allow the user to sort the list via, for example, a ranking from the most safe driver or vehicle to the least of the safe driver or vehicle. Drivers or vehicles that are not safe certified are typically not displayed to the rider. At step 420, the graphical user interface (GUI) generator 342 may receive the selection of the driver or vehicle from the rider. At step 422, the graphical user interface (GUI) generator 342 transmits the information including the safe certification, driver picture, vehicle information as shown in FIG. 5 to the rider. In one embodiment, step 418 and 422 may be done simultaneously or right after one another.

Alternatively, at step 424, the rider can request a different driver or vehicle and the process returns to step 418, where additional drivers or vehicle are provided. At step 426, rider information such as name, picture, current location and final destination and the like may be transmitted to the driver or connected vehicle and at step 428, the process ends.

FIG. 5 illustrates a GUI 500 having driver information 504 and vehicle information 506 according to an embodiment of the disclosure. GUI 500 may be generated by the graphical user interface (GUI) generator 342 to contain information about the driver (the drive information 504), vehicle information 506, a contact icon 508, a map 502 and the location of the connected vehicle 108. Driver information 504 displayed can include a picture of the driver, name of the driver, and a driver safety rating 510. The name of driver may simply be his first name or a pen name. The driver safety rating 510 will show the level of certification that the driver has achieved based on retrieved information discussed herein. The rating may be based on a number of icons (stars, moon, checks and the like), letter rating (A, B, C, D, F including the use of + and −, and the like), number rating (1, 2, 3, 4, 5) and the like. For example, having 5 checks could mean that the driver has highest safe certification possible and 1 check could mean that he achieved on the lowest safe certification possible. The contact icon 508 may be used to contact the driver via text messaging, video conferencing, voice call and the like.

The vehicle information 506 displayed can include a picture of the vehicle, the make and model, license plate, VIN (vehicle identification number) of the vehicle (verifiable between the connected vehicle and the user wireless device and their respective diagnostic app) and the like that will identify the vehicle to the rider. A vehicle safety rating 512, similar to the driver safety rating 510 can be used to show the level of certification that the vehicle has achieved based on retrieved information discussed herein. Contact icon 508 can be used to contact the connected vehicle 108.

It should be noted that "user" and "driver" or "user" and "rider" may be the same person depending on if the user uses the wireless device 110 or connected vehicle 108 to communicate as a rider or a driver. Further, aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions that include routines, programs, objects, components, data structures, and so on, that perform particular tasks or implement particular abstract data types. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks. Additionally, the steps in the flow chart do not have to be performed in the order set forth but can be in any order and be implemented by other components than the ones described.

Although the applications discussed herein are discussed being utilized with a vehicle, such as a car and a hired driver, the applications and embodiments can be utilized with any vehicle such as a plane, boat along with the pilot, captain and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A processor-implemented method of rating a vehicle programmed in a non-transitory processor-readable medium executed on at least one processor of a remote computing device, the method comprising:
    receiving vehicle diagnostic information collected from a vehicle with at least one processor of a remote computing device;
    analyzing the vehicle diagnostic information with the at least one processor to determine a safety rating of the vehicle based on the vehicle diagnostic information, the vehicle diagnostic information comprising at least one or more set diagnostic trouble code (DTC);
    storing the determined safety rating of the vehicle in a database of the remote computing device;
    receiving over a network a request for a vehicle from a rider wireless device with the at the one processor; and
    providing over the network a list of vehicles to the rider wireless device and a corresponding safety rating of the vehicles based on the vehicle diagnostic information for display on the rider wireless device.

2. The rating method of claim 1 further comprising: receiving over the network a selection of a vehicle from the list of vehicles at the at least one processor from the rider wireless device; and sending rider information over the network to a driver wireless device of the vehicle.

3. The rating method of claim 1, wherein the safety rating of the vehicle is also based on other vehicle diagnostic information that is based on at least one of the following: tire pressure, remaining fuel, or brake sensor.

4. The rating method of claim 1, further comprising providing the safety rating from the at least one processor over the network to the rider wireless device for display, wherein the safety rating displayed on the rider wireless device comprises at least one of the following: an icon, a number, or a letter.

5. The rating method of claim 1, further comprising sending vehicle information from the at least one processor over the network to the rider wireless device for display,
    wherein the vehicle information includes at least one of the following: a license plate, a vehicle identification number (VIN), or a picture of the vehicle to the rider.

6. The rating method of claim 5, wherein the VIN number of the vehicle is verified by the rider wireless device communicating with the vehicle,
    wherein the vehicle comprises a connected vehicle.

7. The rating method of claim 1, wherein the at least one processor comprises a diagnostic manager,
    the method further comprising analyzing the vehicle diagnostic information with the diagnostic manager to diagnose a current diagnostic condition of the vehicle to generate the safety rating.

8. The rating method of claim 1, further comprising sending from the at least one processor over the network to the rider wireless device for display a location of each of the listed vehicles,
    wherein the location is displayed on a map displayed on the rider wireless device; and
    wherein the safety rating of the vehicle is also based on other vehicle diagnostic information that is based on tire pressure data, remaining fuel data, or brake sensor data.

9. The rating method of claim 1 further comprising sending from the at least one processor over the network a driver's information to the rider wireless device for display on the rider wireless device,
    wherein the driver's information comprises at least one of the following: a picture of the driver and a name of the driver; and
    wherein the safety rating of the vehicle is also based on other vehicle diagnostic information that is based on tire pressure data, remaining fuel data, or brake sensor data.

10. A computing device that provides a driver and a vehicle along with a safety rating in response to a request from a rider wireless device, the computing device comprising:
    at least one processor configured to control functions of the computing device via software and applications;
    a wireless interface configured to communicate with a rider wireless device; and
    a memory in communication with the at least one processor and configured to store an operating system and computer implemented instructions comprising:

receiving vehicle diagnostic information collected from a vehicle with the at least one processor of the computing device;

analyzing the vehicle diagnostic information with the at least one processor to determine a safety rating of the vehicle based on the vehicle diagnostic information, the vehicle diagnostic information comprising at least one or more set diagnostic trouble code (DTC);

storing the determined safety rating of the vehicle in a database of the computing device;

receiving over a network a request for a vehicle from a rider wireless device with the at least one processor; and providing over the network a list of vehicles to the rider wireless device and a corresponding safety rating of the vehicles based on the vehicle diagnostic information for display on the rider wireless device.

11. The computing device of claim 10 further comprising:
receiving over the network a selection of a vehicle from the list of vehicles at the at least one processor from the rider wireless device; and
sending rider information over the network to a driver wireless device of the vehicle.

12. The computing device of claim 10, wherein the safety rating of the vehicle is also based on other vehicle diagnostic information that is based on at least one of the following: tire pressure, remaining fuel, or brake sensor.

13. The computing device of claim 10,
wherein the computing device is configured to provide the safety rating from the at least one processor over the network to the rider wireless device for display, and
wherein the safety rating displayed on the rider wireless device comprises at least one of the following: an icon, a number, or a letter.

14. The computing device of claim 10,
wherein the computing device is further configured to send vehicle information from the at least one processor over the network to the rider wireless device for display, and
wherein the vehicle information includes at least one of the following: a license plate, a vehicle identification number (VIN), or a picture of the vehicle to the rider.

15. The rating method of claim 1, wherein the receiving the vehicle diagnostic information collected from the vehicle with at least one processor of a remote computing device further comprises receiving the vehicle diagnostic information from a diagnostic system of the vehicle.

16. The rating method of claim 1, further comprising:
providing a ride application for download from an application store to the rider wireless device,
wherein the ride application executes on the rider wireless device, and
wherein the ride application provides at least a safety rating function, a payment function, a vehicle request function, and a location determination function.

17. The rating method of claim 1, further comprising:
receiving driving behavior information collected from the vehicle with the at least one processor of the remote computing device; and
analyzing the driving behavior information with the at least one processor to further determine the safety rating,
wherein the driving behavior information comprises information comprising at least one of the following: hard braking data, excessive acceleration data, excessive braking data, swerving data, evasive maneuver data, crash data, and excessive lane change data.

18. The computing device of claim 10 wherein the at least one processor is further configured to receive the vehicle diagnostic information from a diagnostic system of the vehicle.

19. The computing device of claim 10 wherein:
the at least one processor is configured to receive driving behavior information collected from the vehicle with at least one processor of the computing device; and
the at least one processor is configured to analyze the driving behavior information with the at least one processor to further determine the safety rating,
wherein the driving behavior information comprises information comprising at least one of the following: hard braking data, excessive acceleration data, excessive braking data, swerving data, evasive maneuver data, crash data, and excessive lane change data.

20. A processor-implemented method of rating a vehicle programmed in a non-transitory processor-readable medium executed on at least one processor of a remote computing device, the method comprising:

receiving vehicle diagnostic information collected from a vehicle with at least one processor of a remote computing device;

analyzing the vehicle diagnostic information with the processor to determine a safety rating of the vehicle based on the vehicle diagnostic information, the vehicle diagnostic information comprising at least one or more set diagnostic trouble code (DTC);

storing the determined safety rating of the vehicle in a database of the remote computing device;

receiving over a network a request for a vehicle from a rider wireless device with the at the one processor;

providing over the network a list of vehicles to the rider wireless device and a corresponding safety rating of the vehicles based on the vehicle diagnostic information for display on the rider wireless device;

receiving over the network a selection of a vehicle from the list of vehicles at the at least one processor from the rider wireless device;

sending rider information over the network to a driver wireless device of the vehicle;

sending from the at least one processor over the network a driver's information to the rider wireless device for display on the rider wireless device, wherein the safety rating displayed on the rider wireless device comprises at least one of the following: an icon, a number, or a letter;

wherein the analyzing the vehicle diagnostic information further comprises analyzing the vehicle diagnostic information with a diagnostic manager configured to diagnose a current diagnostic condition of the vehicle to generate the safety rating; and wherein the driver's information comprises at least one of the following: a picture of the driver and a name of the driver.

* * * * *